United States Patent [19]
Vollet

[11] Patent Number: 5,370,580
[45] Date of Patent: Dec. 6, 1994

[54] TORSIONAL VIRATION DAMPER

[75] Inventor: Eric M. Vollet, Netherthong, England

[73] Assignee: Holset Engineering Company, Ltd., Turnbridge, United Kingdom

[21] Appl. No.: 979,507

[22] Filed: Nov. 20, 1992

[30] Foreign Application Priority Data

Nov. 23, 1991 [GB] United Kingdom ................. 9125113

[51] Int. Cl.$^5$ ............................................... F16D 3/12
[52] U.S. Cl. .......................................... 464/24; 464/58
[58] Field of Search ............................ 464/24, 58, 59; 192/106.1

[56] References Cited

U.S. PATENT DOCUMENTS 4,690,256  9/1987  Bopp et al. ..................... 464/58 X Primary Examiner—Daniel P. Stodola
Assistant Examiner—John Q. Nguyen
Attorney, Agent, or Firm—Gary M. Gron

[57] ABSTRACT

A torsional vibration damper in which variable volume chambers pump oil through restricted passages in response to relative torsional movement between a driven and inertia member in the damper. The passages are connected to radially inner and outer sides of an annular spring. Torsional oscillation causes the spring to deflect in a circumferential direction and the restricted passages damp the vibration.

17 Claims, 6 Drawing Sheets

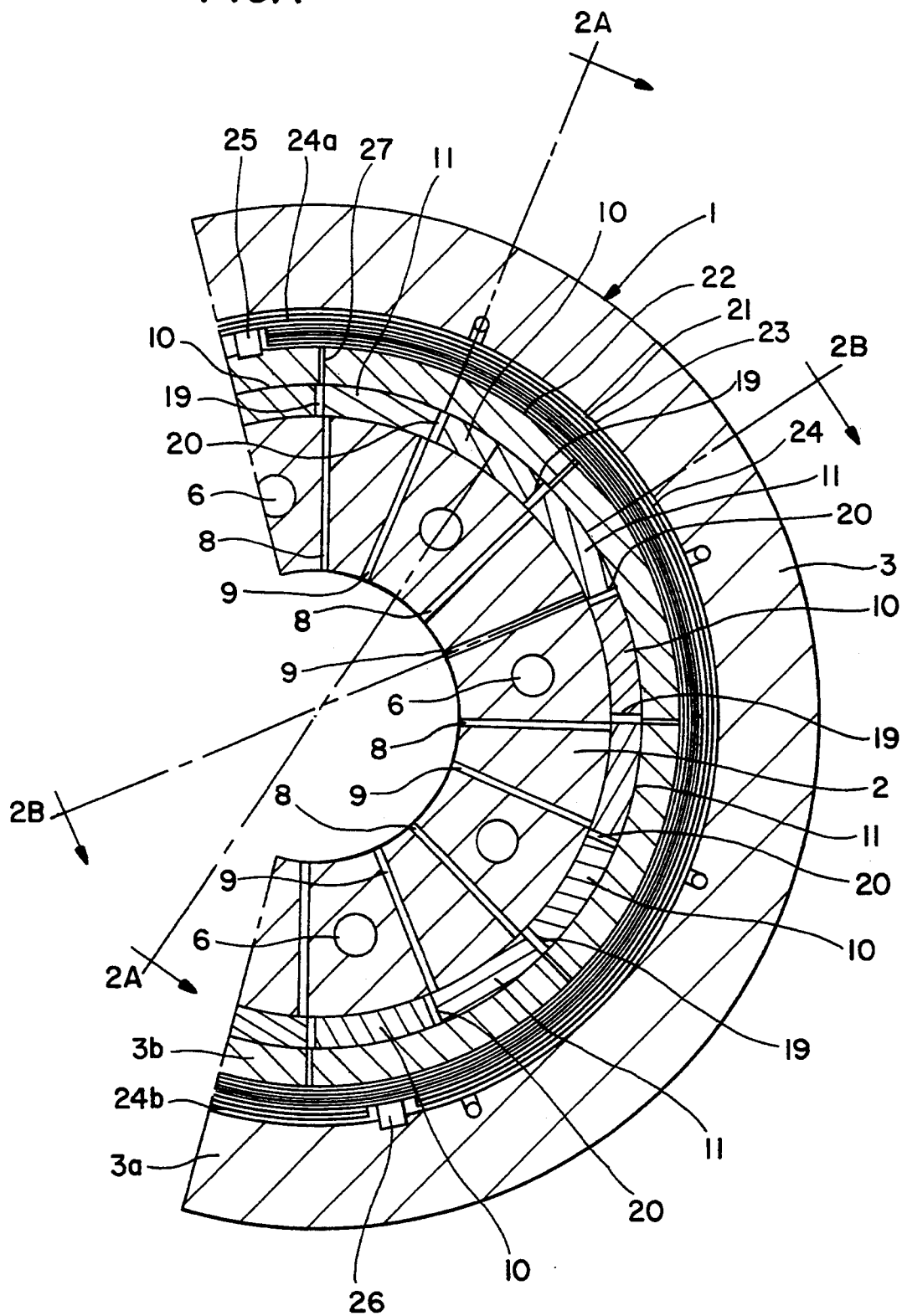

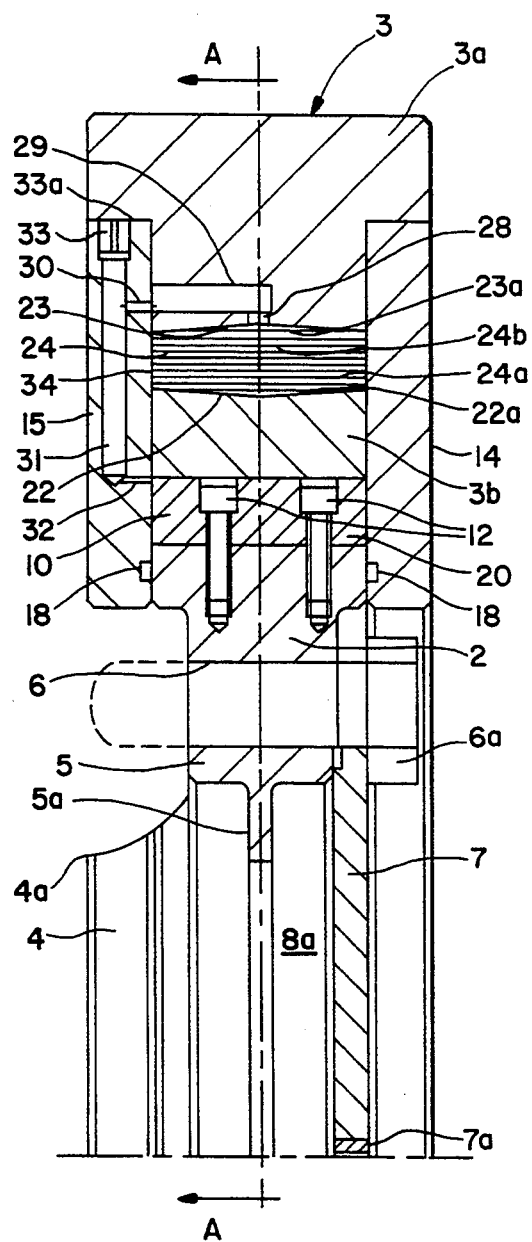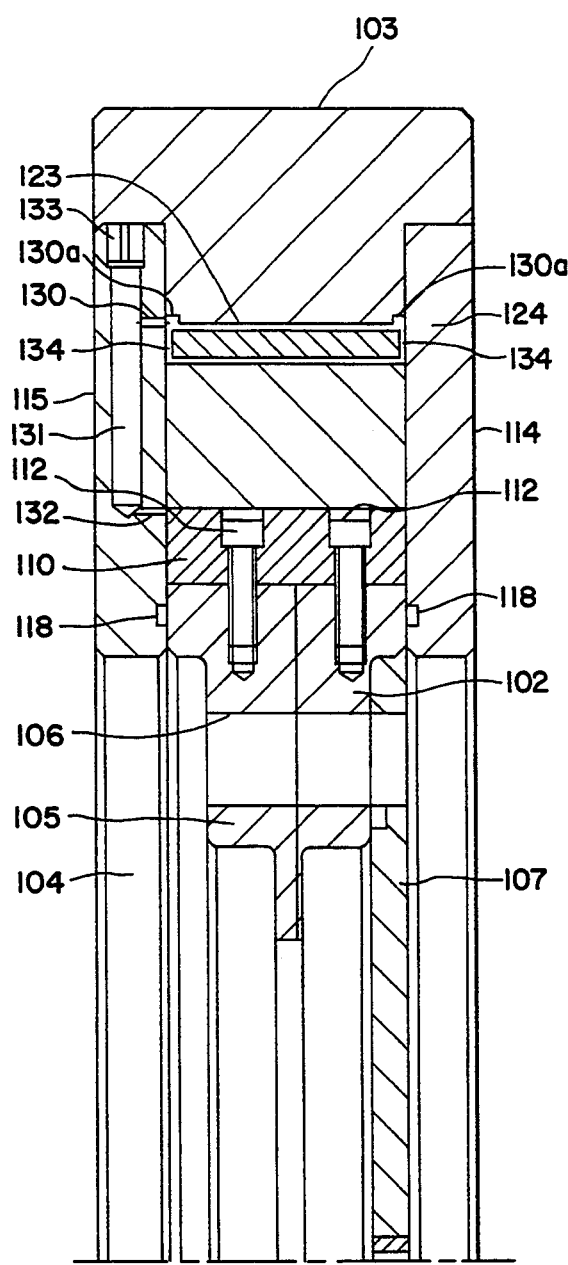

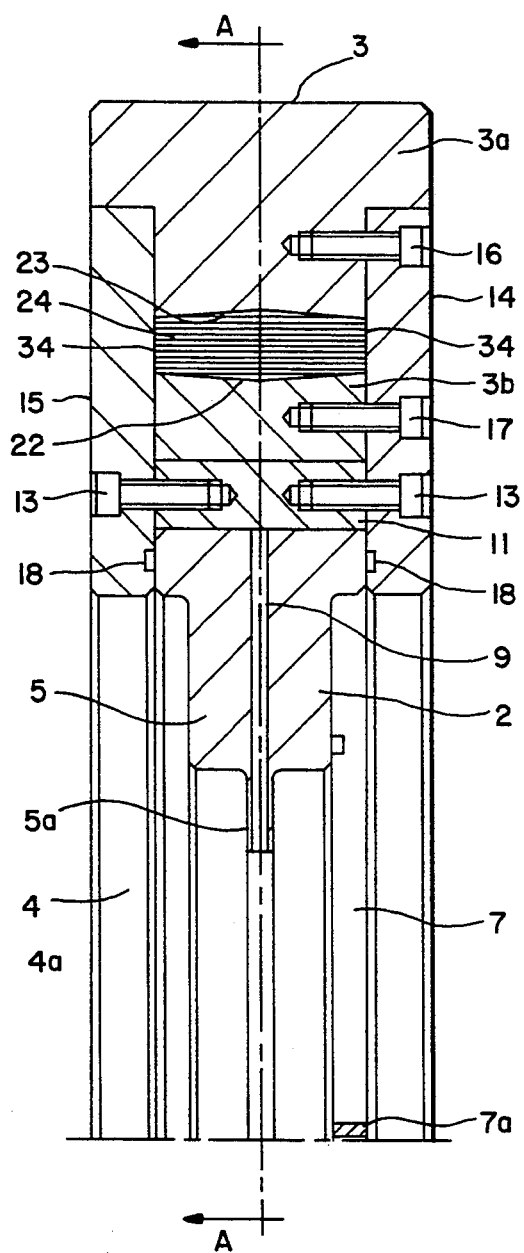
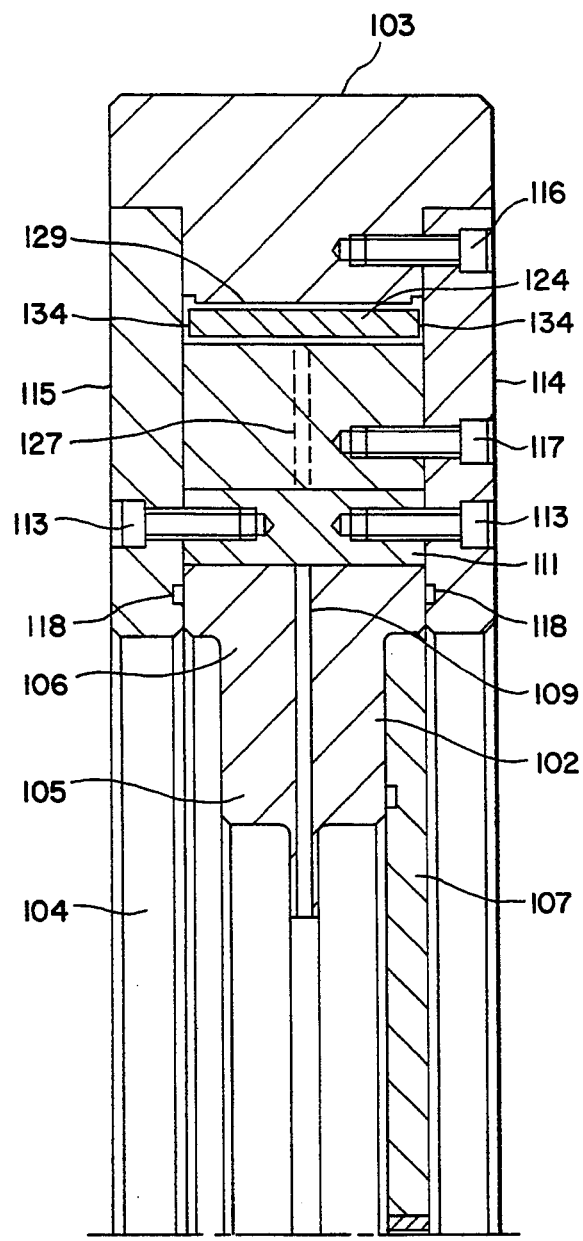

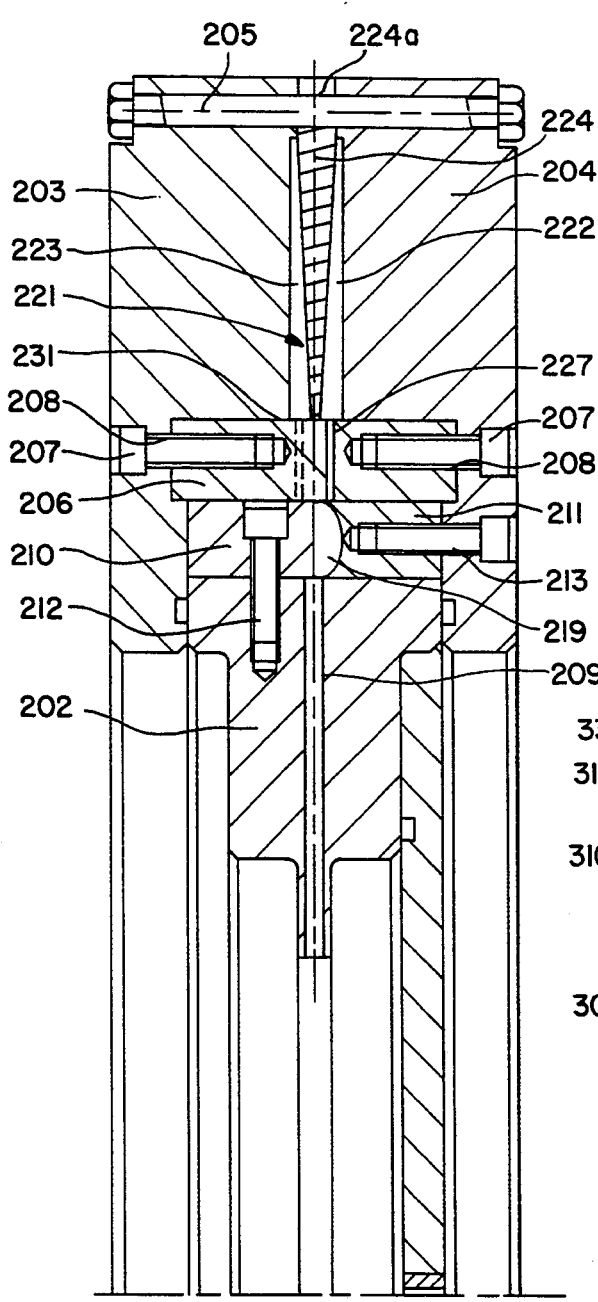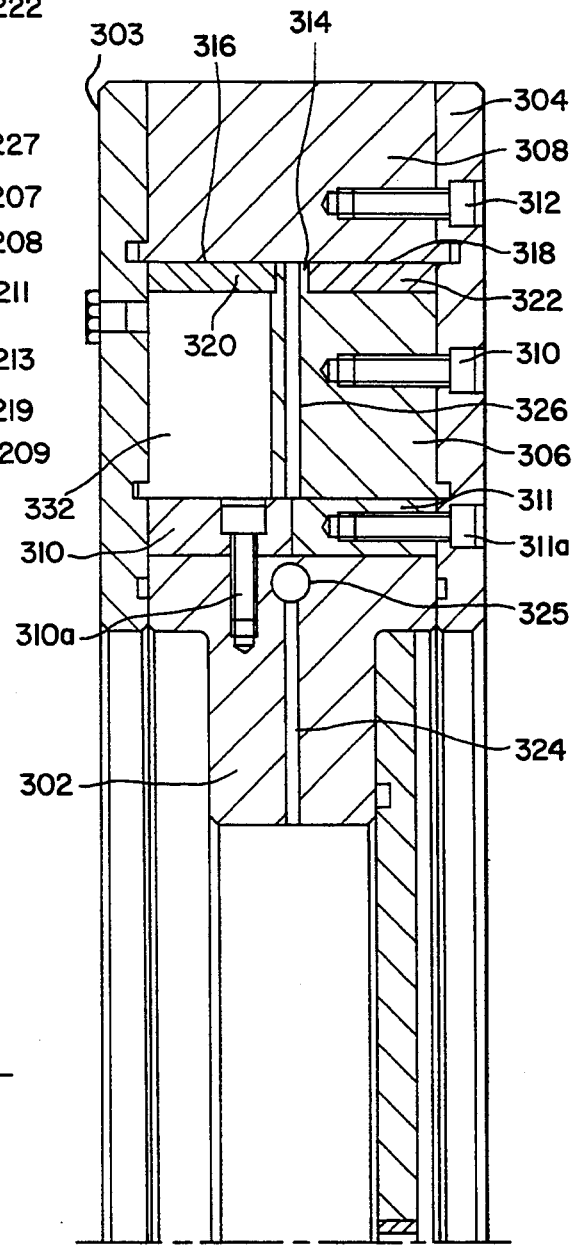

TORSIONAL VIRATION DAMPER

TECHNICAL FIELD

The present invention relates to a torsional vibration damper and more specifically to such a damper for use in damping the torsional vibrations of an engine crankshaft.

BACKGROUND ART

It is known to provide a torsional vibration damper for an engine crankshaft in which a rotary body incorporates a plurality of steel springs interconnecting inner and outer body members for relative rotation with a desired stiffness. Damping is achieved by pumping engine oil between different cavities within the damper construction. U.S. Pat. No. 3,996,767 is an example of this type of damper. Such dampers are likely to require the complex assembly of many precision-machined parts which make them inherently expensive. U.S. patent application Ser. No. 805,346, filed on Dec. 9, 1991 and of common assignment with the present invention, proposes a more economical damper construction but still utilizes a multiplicity of steel springs.

It is an object of the present invention to provide a torsional vibration damper in which the above disadvantage is obviated or mitigated.

DISCLOSURE OF THE INVENTION

According to the present invention there is provided a torsional vibration damper comprising annular driven and inertial members co-axial with one another and capable of limited relative rotational movement.

Means fixed to said driven and inertia member are provided for forming at least one set of variable volume chambers arranged so that relative movement of said driven and inertia members in a first direction decreases the volume of one of the chambers and increases the volume of the other, relative movement in the opposite direction causing a reverse variation in the volume of the chambers.

At least one annular spring is carried by one of said members, and the variable volume chambers are connected to at least one side of said annular spring, the damper being supplied with a source of fluid in the chambers whereby relative rotational movement of said members pressurizes the one side of the annular spring to cause it to flex in a circumferential direction.

Other important advantages and objects of the invention will become apparent from a consideration of the following brief description of the drawings and the best mode for carrying out the invention.

BRIEF DESCRIPTION OF THE DRAWINGS

FIG. 1 is a cross sectional view of one embodiment of a torsional vibration damper in accordance with the invention;

FIG. 2a is a partial sectional view taken on lines B—B of FIG. 1;

FIG. 2b is a partial sectional view taken on lines C—C of FIG. 1;

FIGS. 3a and 3b are partial sectional views of an alternative embodiment of the damper of FIG. 1;

FIG. 4 is a partial sectional view of a second alternative embodiment of the present invention;

FIGS. 5 and 5a are partial sectional views of a third alternative embodiment of the present invention.

BEST MODE FOR CARRYING OUT THE INVENTION

Figure 5A:
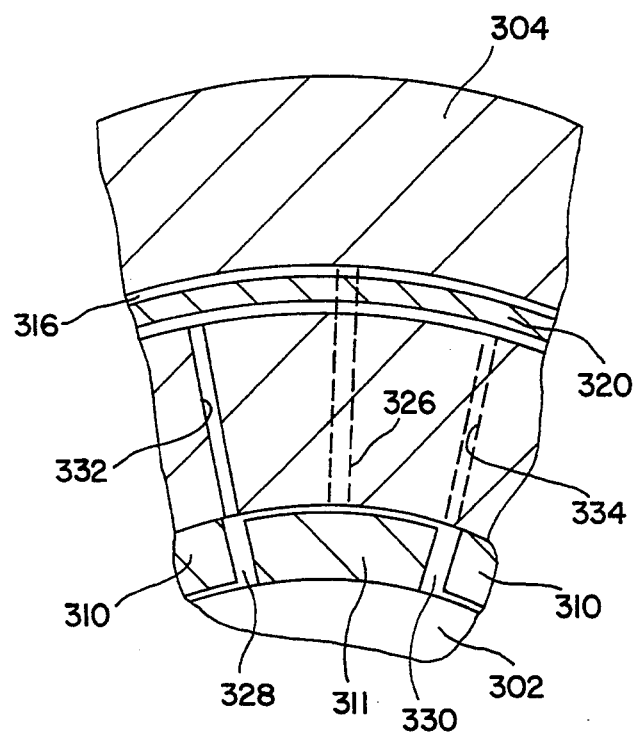

Referring now to FIGS. 1, 2a and 2b, the exemplary torsional vibration damper comprises a rotary body 1 of flat cylindrical shape having an inner annular hub member 2 and an outer inertial member 3. The members 2, 3 normally rotate in unison, for example with the end of an engine crankshaft, but torsional vibrations in the crankshaft tend to produce limited relative rotation of the hub member 2 with respect to the outer inertial member 3. The damping effect is achieved by damping such relative rotation. In the following description it is assumed that the vibration damper is intended for damping the torsional vibrations of an engine crankshaft using engine oil as a damping fluid. It will be appreciated, however, that alternative applications involving other damping fluids are possible.

The hub member 2 has a bore 4 for receiving the end of a crankshaft 4a extending from the left in FIG. 2 and abutting an inwardly projecting flange 5 of the hub member 2. An annular cover 7 closes one end of a central chamber 8a (the other end of which is defined by the crankshaft end) against egress of engine oil supplied through the center of the crankshaft. A series of screws 6a extend through cover 7, holes 6 and are threaded into the end of crankshaft 4a to hold the assembly in place. An annular web 5a projects inwardly into the central chamber 8a. Pairs of radial flow passages 8, 9 (see FIGS. 1 and 2b) extend from the radially inward edge of web 5a, through hub 2 to its periphery. Passages (not shown) in crankshaft 4a provide a supply of oil to chamber 8a which forms an oil reservoir at the center of the hub member 2 to connect with a damping pressure circuit to be described via passages 8, 9. Centrifugal force drives the oil in the central chamber 8a outwardly through the passages 8, 9. Any solid particles accumulate at the outside circumference of the chamber 8a to either side of the web 5a. Separated air collects at the center of the chamber and exits through orifice 7a in the cover 7.

The outer periphery of the hub member 2 has attached thereto a plurality of arcuate blocks 10 interdigitated with a plurality of arcuate blocks 11 attached to the inner annular surface of the outer inertial member 3. The arcuate blocks 10 are connected to the main body of the hub member 2 by radially directed screws 12 as shown in FIG. 2a. The arcuate blocks 11 are fixed to the side plates 14 and 15 of the outer member 3 by screws 13 (FIG. 2b).

A pair of outer and inner rings 3a, 3b are secured to the annular side plates 14, 15 by screws 16, 17, respectively. The annular side plates 14, 15 overlap the hub member 2 and oil seals 18 are provided at the contact surfaces of side plates 14 and 15. The arcuate blocks 10, 11 are separated by gaps in the circumferential direction associated in pairs 19, 20 with the pairs 8, 9 of flow passages in the hub member 2 (FIG. 1).

The outer and inner rings 3a and 3b of outer member 3 define between them an annular spring chamber 21 divided into radially inner and outer spring compartments 22, 23, respectively by an annular spring 24. As shown in FIGS. 1, 2a and 2b the spring 24 is of laminated construction with a plurality of split or circumferentially discontinuous inner and outer spring leaves 24a, 24b, respectively, held in adjacent relationship by angled walls 22a, 23a of the inner and outer spring chambers 22, 23, respectively. As noted particularly in FIG. 2a, the side edges of the springs 24a and 24b are clamped in a stack between inner and outer rings 3a and 3b so that any deflection occurs in the middle sections of the springs. Inner and outer keys 25, 26 prevent rotation of the inner springs 24a and outer springs 24b, respectively, within the spring chamber 21.

As shown in FIG. 1, each of the gaps 19 form with the inner spring compartment 22 a pressure circuit including the axial gap 19 and a radial flow passage 27 interconnecting the gap 19 and the inner spring compartment 22. As shown particularly in FIG. 2a, the axial gap 20 is interconnected with the outer spring compartment 23 by a flow passage including a central port 28 connected by a transverse bore 29 to respective orifices 30 in the side plates 14, 15. Orifices 30 in turn connect with radial bores 31 in the side plates and further orifices 32 connect with opposite ends of the axial gap 20. The radially outer end of the bore 31 is provided with an orifice 33 opening to a recess 33a in outer ring 3 to permit controlled leakage of oil. Alternatively, the passages of the pressure circuit connecting the axial gaps 20 with the outer spring compartment 23 may be constricted throughout their length instead of incorporating discrete orifices.

The operation will now be described by reference to one pair of flow passages 8, 9 in the hub member 2 and the associated pressure circuit including one pair of axial gaps 19, 20. Torsional vibration in the crankshaft 4a causes slight rotation of the hub member 2 relative to the outer inertial member 3. Assume that the hub member 2 in FIG. 1 rotates clockwise with respect to the stationary outer member 3. The arcuate block 11 forming part of the outer member 3 also remains stationary but the next following block 10 forming part of the hub member 2 also moves clockwise. The leading gap 20 of each gap pair is therefore increased in width and the trailing gap 19 is reduced in width. At the same time the trailing flow passage 8 in the hub member 2 is carried under the segment 11 to close the passage against return flow of oil from the axial gap 19 inward toward the center of the damper. Oil from the contracted axial gap 19 is thus forced through the constricted flow passage 27 into the inner spring compartment 22 and the combined force of the oil from these passages 27 causes the spring 24 to flex outwardly around its periphery thereby displacing oil from the outer spring compartment 23 to each end of each axial gap 20 via bores 28, 29, 31 and orifices 30, 32. Damping of the torsional vibrations is thus achieved by forcing oil through the constricted flow passages 27 of one-half of each pressure circuit and through the orifices 30, 32 of the other half of each pressure circuit. Reverse rotation of the hub member 2 results in compression of the gaps 20 and expansion of the gaps 19 with a reverse flow of oil in the pressure circuits.

In practice torsional vibration will result in oscillation of the hub member 2, with respect to the outer inertial member 3 with consequent flow reversals in the pressure circuits. The energy dissipated by the damping action is converted into heat and the oil in the pressure circuits is kept at an acceptable temperature by permitting controlled leakage through the jets 33 in the side plates 14, 15. Lower temperature make-up oil is supplied through the flow passages 8, 9 in the hub member 2 when the axial gaps 19, 20 are in fluid communication with the passages.

Since the design relies on displaced oil to load the spring 24, it is important to eliminate the effects of any air in the system and a leakage path is provided so that as the oil is centrifuged outwardly air travels towards the damper center via clearances 34 between the spring 24 and the side plates 14, 15. The clearances are selected so that air can pass but that a minimum of oil would leak past the opening. typically, the clearances 34 would be on the order of a thousandth of an inch for oil having a viscosity similar to motor oil.

In the embodiment shown in FIGS. 3a and 3b, parts corresponding to those of the first embodiment are identified by the same reference numerals increased by 100 and are not further described. In the FIGS. 3a and 3b embodiment, the laminated spring 24 of FIGS. 2a and 2b is replaced by a non-laminated cylindrical spring 124 having a rectangular cross section. If required, an O-ring 124a is compressed between the spring 124 and the outer wall of annular chamber 123. The clearances at 134 are exaggerated in the drawing but it will be understood that they are dimensioned to prevent passage of oil from one side of the spring to the other but permit flow of entrained air. The spring 124 is self-supporting as compared to the spring 24 with its keys 25, 26. As a result, friction is avoided and stresses are reduced.

The arcuate blocks 110 and 111 form gaps 119 and 120 with the same characteristics as the gaps 19 and 20 of FIG. 1. The pressure circuit to the radially inward side of spring 124 from gaps 119 is via radial passages 127. The pressure circuit to the radially outer side of spring 124 from gaps 120 is via orifices 132, passage 131 and further orifices 130 which open into annular grooves 130a formed at opposite ends of the outer chamber 123.

The spring 124 expands in the circumferential direction to provide the appropriate spring force for the damping of FIGS. 3a and 3b. It will be appreciated that the actual expansion will be very little in order to obtain the desired performance.

Referring to FIG. 4, the spring may be an axially flattened washer-like ring 224 dividing the spring chamber 221 into axially spaced compartments 222, 223 connecting with respective axial gaps. The spring of FIG. 4 may be plain or laminated. In the case of a laminated spring as illustrated in FIGS. 1 and 2, spring stresses can be reduced by using narrower spring leaves towards the center of the spring.

For either embodiment, the outer periphery 224a is clamped between annular housings 203 and 204 by bolt and nut assemblies 205. An annular plate 206 is held between housings 203 and 204 by screws 207 extending through holes 208 and threaded into plate 206. Plate 206 forms the inner periphery of spring chamber 221.

The damper in FIG. 4 has an inner hub 202, partially positioned between the inner peripheries of housings 203, 204, and adapted to be mounted to the front of a crankshaft (not shown) by suitable fasteners (also not shown). Radial passages 209 extend through hub 202 to provide a flow of oil to annular chamber between hub 202 and plate 206.

A plurality of arcuate blocks 210 are fastened to the outer periphery of hub 202 by screws 212. Blocks 210 are interdigitated with blocks 211 secured to housings 203 and 204 by screws 213. Blocks 210 and 211 form variable gaps 219 and 220 (not shown) between them.

Gaps 219 are connected to chamber 222 by radial passages 227 and gaps 220 are connected to chamber 223 by passages 231 shown in dashed lines.

The operation of the damper in FIG. 4 is like the previous damper except that spring 224 deflects in an axial direction.

In some circumstances it is desirable to reduce the locally high velocity that results from the use of orifices in the pressure circuits to the springs. As shown in FIGS. 5 and 5a, a damper embodying still another alternative comprises an inner hub 302 adapted to be secured to the end of a crankshaft (not shown) by a plurality of screws (also not shown). A pair of end plates 303 and 304 partially overlap the hub 302 and are fixed to inner and outer ring elements 306, 308 by screws 310, 312, respectively. Inner ring 306 has an outer circumferential rib 314 dividing the space between inner and outer ring elements 306, 308 into side-by-side spring chambers 316, 318. Springs 320, 322 are positioned in chambers 316, 318, respectively, with side clearances like those selected for the embodiment of FIG. 3.

Series of radial passages 324 extend through hub 302 to provide a supply of oil between hub 302 and inner ring element 306. To more completely prevent backflow in passages 324 a check valve 325 is positioned in each passage close to the space between the hub 302 and inner ring element 306. Check valve 325 permits flow only in a radially outward direction. A plurality of arcuate blocks 310 are fixed to the periphery of hub 302 by screws 310a. Blocks 310 are interdigitated with blocks 311 secured to end plates 303 and 304 by screws 311a.

As shown particularly in FIGS. 5 and 5a, a radial passage 326 extends through inner ring 306 and through rib 314 to provide venting of air towards the center of the damper. It should be noted that rib 314 has sufficient clearance added around its periphery to permit free flow of damping fluid between side-by-side spring chambers 316 and 318.

As noted in FIG. 5a, the arcuate blocks 310, 311 form pairs of gaps 328 and 330 between them. A flow connection is established between gap 328 and the spring chamber 316 by a groove 332 formed in the inner ring 306. Groove 332 is cut in the side axial face of ring 306 and extends to a point just adjacent the center of the ring. The gap 330 is connected to spring chamber 318 by a groove 334 cut in the end face of inner ring 306 and extending from the right side as shown in FIG. 5 to a point adjacent the middle of the ring.

Operation of the ring shown in FIG. 5 is as follows: during operation of an engine, the hub 302 and outer assembly including ring 306 oscillate relative to one another in a rotational direction. Assume that during this oscillation the hub member 302 moves in a counter-clockwise direction thus decreasing the gap 328. The liquid in the gap is thus applied to the radially inward side of spring 320 causing it to flex outwardly at the same time the fluid in the outer portion of spring chamber 316 flows across the gap around the periphery of web 314 to exert an inward pressure in chamber 318 on spring 322. Any fluid on the radially inward side of spring 322 expands through groove 334 into expanded chamber 330. Thus the opposite oscillation produces a corresponding result. Thus it is seen that when one of the springs is expanding, the other is contracting. The dimension of the grooves 332, 334 is selected so as to provide the appropriate restriction to flow and thus dampen the vibrations. It should be noted that sufficient leakage past the edges of the springs 320 and 322 into the radially outward portion of the spring chambers 316 and 318 occurs so as to provide a supply of fluid to provide the force transfer between the springs.

Figure 6A:
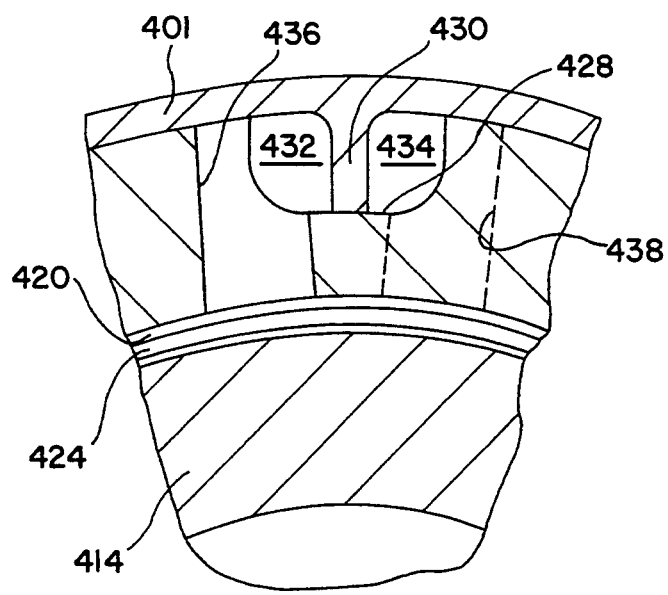
FIGS. 6 and 6a are partial sectional views of a fourth alternative embodiment of the present invention.
Figure 6:
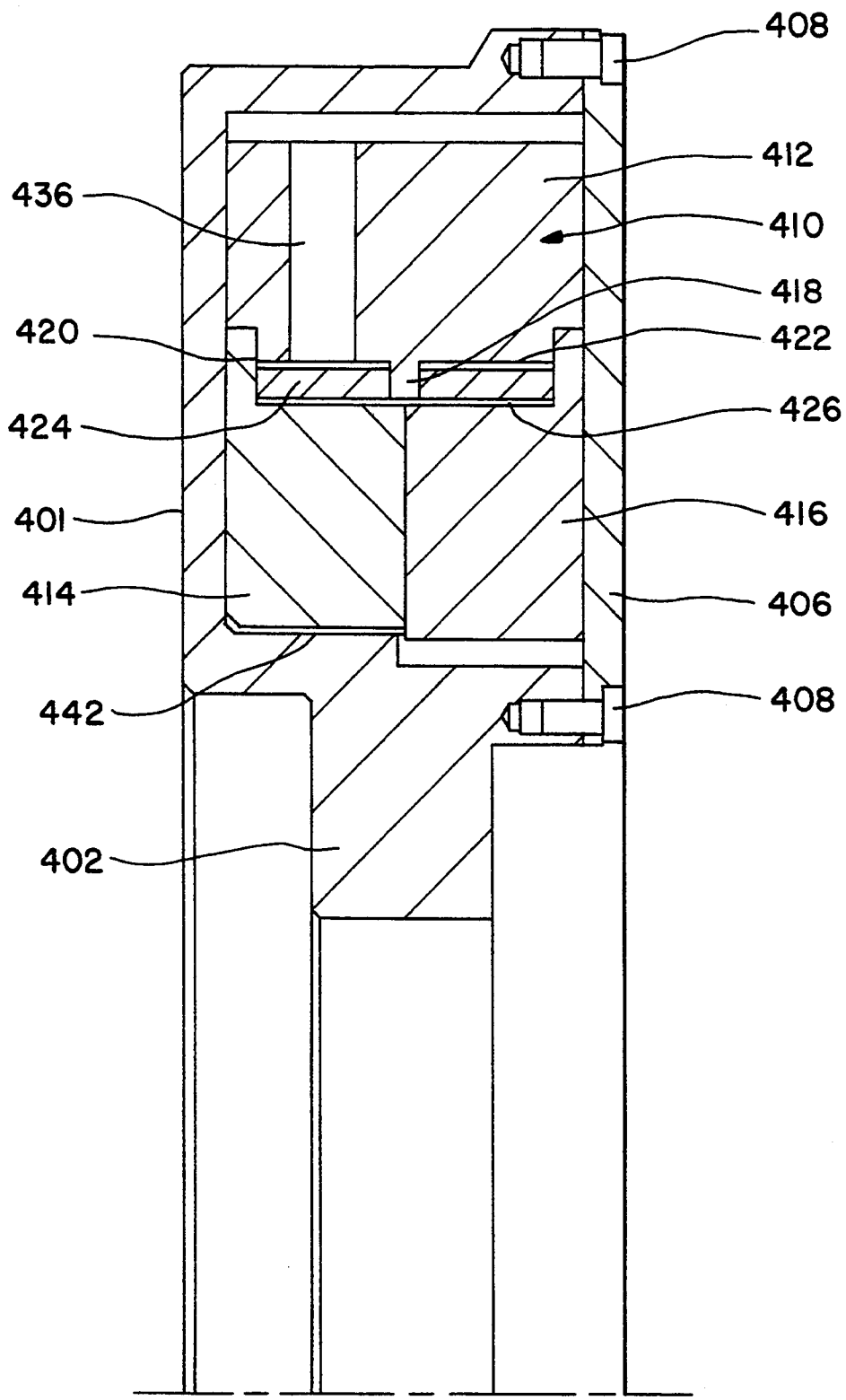

Referring now to FIGS. 6 and 6a, still another embodiment of the present invention, comprises an annular outer housing 401 having an integral interannular hub portion 402 adapted to be suitably fixed to a crankshaft (not shown). Housing 401 has a generally channel-shaped chamber 404 sealed off by an annular end plate 406 secured to annular housing 401 by screws 408. An inertia ring assembly 410 is positioned within chamber 404 and comprises an outer annular ring 412 and a pair of inner annular rings 414 and 416 suitably attached to each other and to the outer ring 412 by appropriate fastening devices (not shown). Outer ring 412 has an inwardly facing annular rib 418 which faces the outer periphery of the inner rings 414 and 416 to form a pair of the spring chambers 420 and 422. Annular unitary springs 424 and 426 are positioned within chambers 420, 422, respectively.

As shown particularly in FIG. 6a, the outer ring 412 has an axially extending groove 428 which receives an integral web 430 formed on housing 401 and directed radially inward. Rib 430 divides the recess 428 into first and second variable volume chambers 432 and 434. A radially extending passage 436 connects with chamber 432 and with the radially outer portion of the spring 424. Another radial passage 438 connects with chamber 434 and with the radially outer portion of the spring 426. The damper of FIGS. 6 and 6a is designed to be self-contained and to that end is filled with a highly viscous silicon damping fluid to provide the damping for the assembly. The inertia ring assembly 410 is journaled within housing 401 by a suitable teflon bearing 440 on the radially inner diameter 442 of ring 414. It should be noted that the rib 418 has sufficient clearance, keeping in mind the viscosity of the working fluid, to permit flow between the radially inner side of spring 424 to the corresponding side of spring 426. In operation the damper experiences the usual torsional oscillations of the previous embodiments.

As viewed in FIG. 6a, if the inertia member relative to the housing 401 moves in a clockwise direction, the chamber 432 is reduced in size thus forcing viscous fluid through passage 436 and on to the radially outer surface of spring 424 flexing it in an inward direction. When this occurs, fluid is forced across the web 418 to the radially inner side of spring 426 thus causing it to expand in an outward direction. Any displacement of fluid is permitted because the chamber 434 has increased in size. Because the working fluid is highly viscous, discreet orifices or restricted flow passages are not necessary to achieve the desired damping of the fluid. Relative rotation of the elements produces a reverse flexing of the springs. The damper of FIG. 6, 6a is advantageous in that it can be self-contained and not require a supply of lubricant in the engine lubrication system.

In all of the designs disclosed above previous complex multi-spring systems have been replaced by single, easily installed springs that provide a high degree of simplicity in the accurate and economical assembly of the damper. At the same time, the possibility of tailoring the dampers for a specific engine environment can be easily accommodated in the design and dimensions of the spring.

It will be appreciated that numerous modifications may be made without departing from the scope of the

What is claimed is:

1. A torsional vibration damper comprising:
an annular driven member,
an annular inertia member, co-axial with said driven member and capable of limited rotational movement relative thereto,
means fixed to said driven and inertia members for forming at least one set of first and second variable volume chambers arranged so that relative movement of said driven and inertia members in a first direction decreases the volume of the first of said chambers and increases the volume of the second of said chambers, relative movement in the opposite direction causing a reverse variation in the volume of said chambers,
at least one annular spring carried by one of said members, and
means for connecting said variable volume chambers to at least one radial side of said at least one annular spring, said damper being supplied with a source of fluid which is supplied to said chambers whereby relative rotational movement of said members pressurizes the one side of said at least one annular spring to cause said annular spring to flex in a radial direction.

2. A damper as claimed in claim 1 wherein:
said annular members form an annular chamber therebetween,
said damper comprises arcuate interdigitated blocks positioned in said annular chamber and alternately affixed to said members to provide variable gaps between said blocks, thereby defining said variable volume chambers.

3. A damper as claimed in claim 2, wherein:
one of said members has flow passages for supplying fluid to the variable volume chambers for filling and replenishing the variable volume chambers, connecting means, and said at least one annular spring with fluid,
said damper further comprising means for preventing return flow of fluid along said passages.

4. A damper as claimed in claim 3, wherein:
one of said members is radially inward of the other and has a plurality of radial supply passages extending from a central fluid supply to said variable volume chambers, the radial supply passages being oriented relative to said members so that the outer member blocks flow through said radial supply passages when a variable volume chamber is decreasing in volume and permitting flow when it is increasing in volume.

5. A damper as claimed in claim 3 wherein said means for preventing return flow of fluid comprises a one way valve.

6. A damper as claimed in claim 1 wherein:
one of said members has formed therein an annular spring chamber, said at least one annular spring being positioned within said spring chamber to form radially inner and outer spring chambers, and
said at least one annular spring comprises a plurality of leaf springs positioned in said spring chamber, said connecting means extending from said variable volume chambers to at least one of the inner and outer spring chambers.

7. A damper as claimed in claim 6 wherein:
said leaf springs are circumferentially discontinuous with end gaps oriented so that the end gaps do not line up.

8. A damper as claimed in claim 7 wherein:
said leaf springs are clamped at their side edges so that the flexing in response to fluid pressure occurs along their middle sections.

9. A damper claimed in claim 1 wherein:
one of said members has formed therein an annular spring chamber, said at least one annular spring being positioned within said spring chamber to form radially inner and outer spring chambers, and
said at least one annular spring comprises a unitary annular spring.

10. A damper as claimed in claim 1 wherein one of said members has formed therein at least one annular spring chamber, said at least one annular spring being positioned in said spring chamber to form radially inner and outer spring chambers, said connecting means comprises:
means for forming a passageway from the first of said variable volume chambers to the radially inner spring chamber, and
means for forming a passageway from the second of said variable volume chambers to the radially outer spring chamber.

11. A damper as claimed in claim 10 further comprising orifice means in said connecting means for restricting fluid flow therethrough therefore damping relative movement of said members.

12. A clamper as claimed in claim 10 wherein said connecting means are formed by elongated grooves each having a sufficiently small crossection to restrict fluid flow for damping but to maintain fluid in a laminar flow condition.

13. A damper as claimed in claim 1 wherein:
said damper has two annular springs and one of said members has formed therein a pair of adjacent annular spring chambers in which the two annular springs are respectively positioned, said one member having a flow passage interconnecting said adjacent springs on the same side thereof in the radial direction,
said connecting means providing a connection between adjacent variable volume chambers and the opposite radial sides of said annular springs,
whereby relative movement of said members causes one annular spring to expand in a radial direction and the other spring to contract in a radial direction.

14. A damper as claimed in claim 13 wherein said variable volume chambers are positioned radially inwardly of said spring chambers.

15. A damper as claimed in claim 13 where said variable volume chambers are positioned radially outwardly from said spring chambers.

16. A damper as claimed in claim 1 wherein one of said members has formed therein an annular spring chamber, said at least one annular spring being positioned within said spring chamber to form radially inner and outer spring chambers, said damper further comprising means for forming a passageway for venting air radially inward.

17. A damper as claimed in claim 16 wherein said at least one annular spring has a clearance between the wall of said spring chamber sufficient to permit flow of air radially inwardly but impede flow of fluid radially outward across said spring thereby forming said vent air passageway.

* * * * *